Dec. 11, 1934.  W. O. LYTLE  1,983,626

MOVING PICTURE SCREEN

Filed May 10, 1933

INVENTOR
W. ORLAND LYTLE.
BY
ATTORNEYS

Patented Dec. 11, 1934

1,983,626

UNITED STATES PATENT OFFICE 1,983,626

MOVING PICTURE SCREEN

William O. Lytle, New Kensington, Pa., assignor to Duplate Corporation, a corporation of Delaware Application May 10, 1933, Serial No. 670,286

2 Claims. (Cl. 88—24)

Figure 1:
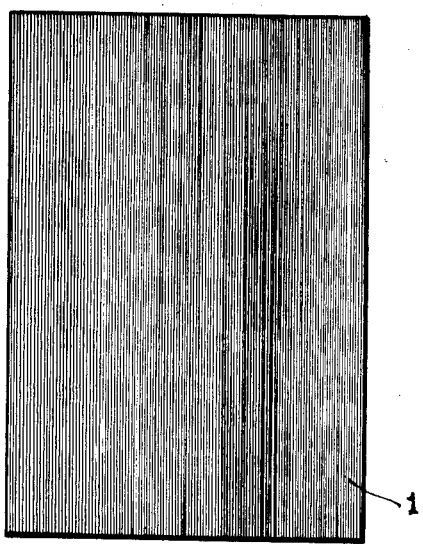
Figure 2:
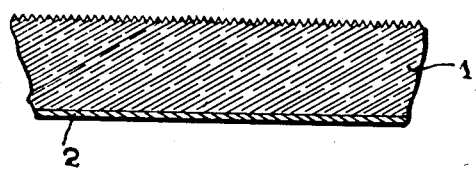

The invention relates to a moving picture screen of glass. It has for its objects the provision of a screen of glass which will give a better dispersion of the reflected light than the glass screens heretofore proposed. It involves the use of a plate of glass silvered on its rear side and having its front face treated to give the desired dispersion of light. One embodiment of the invention is shown in the accompanying drawing, wherein:

Figure 1 is a face view of the screen. And Fig. 2 is a partial horizontal section therethrough on an enlarged scale.

In the drawing, 1 represents a plate of glass, and 2 a reflecting coating, such as silver, mercury or the like on the back of the plate. Briefly stated, the invention consists in treating the front face of the glass sheet so as to cover it with fine vertical lines, which result may be accomplished by pressing, molding or grinding, preferably by grinding. The production of the desired result by grinding involves carrying the plate over an abrasive wheel or roller transversely of the axis thereof so that the face of the plate has a ground appearance, which, on close examination, is found to consist of very fine parallel lines running the length of the screen. The fineness of these lines will depend on the fineness of grain of the wheel or roll, a relatively fine grained wheel or roll being preferred.

A screen of this kind disperses the light laterally much better than one which is ground in the usual way, so that pictures shown on the screen are more distinctly seen when viewed from the sides of the room in which the screen is used. It will be understood that in practice the silvering will be protected by other coatings as is customary in mirror work and that, if desired, the glass plate may be suitably reinforced or laminated to prevent breakage.

What I claim is:

1. A moving picture screen of glass having its rear surface provided with a metallic reflecting coating and its front light-dispersing surface composed of fine closely spaced lines extending in a vertical direction.

2. A moving picture screen of glass having its rear surface provided with a metallic reflecting coating and its front surface reduced to a ground appearance by fine closely spaced parallel lines therein extending in a vertical direction.

WILLIAM O. LYTLE.